Oct. 23, 1962     M. E. WHITENACK     3,059,663
RAPID RESPONSE IN-MOTION CONTROL DEVICE
Filed Sept. 21, 1956     4 Sheets-Sheet 1

Inventor:
Mirl E. Whitenack
By Gary, Desmond & Parker
Attys.

Oct. 23, 1962  M. E. WHITENACK  3,059,663
RAPID RESPONSE IN-MOTION CONTROL DEVICE
Filed Sept. 21, 1956  4 Sheets-Sheet 2
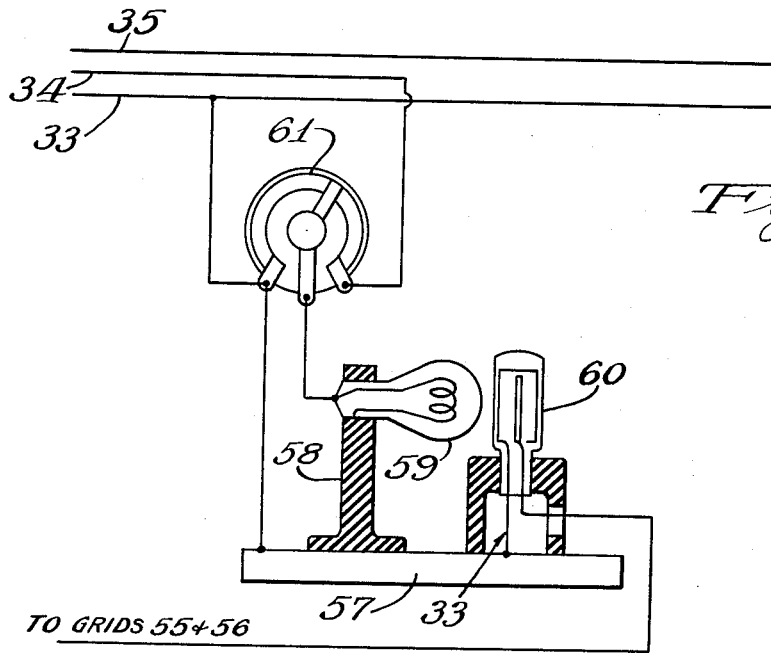
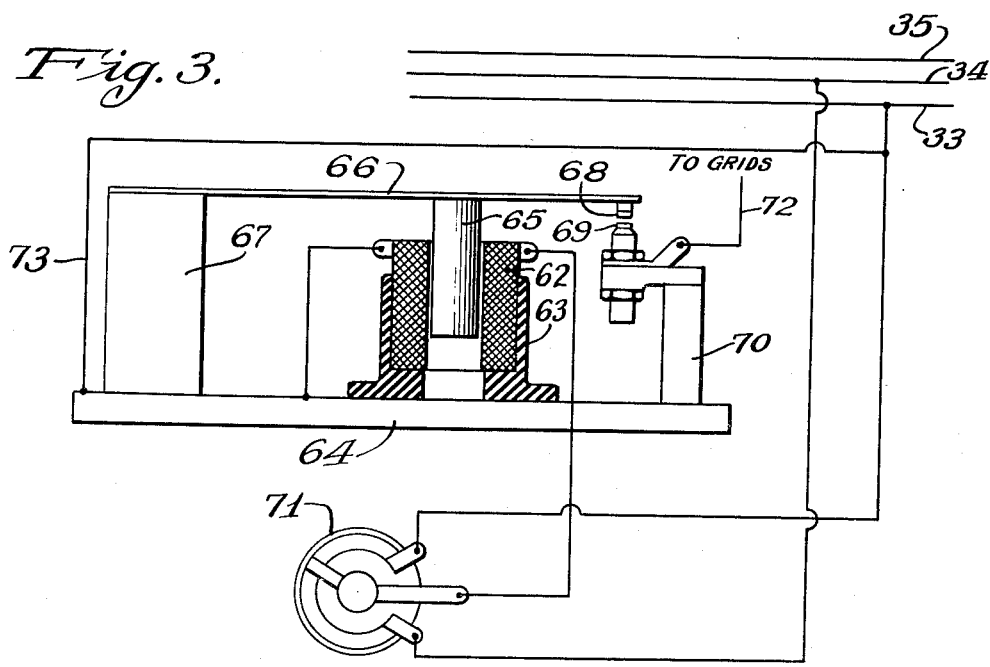
Inventor:
Mirl E. Whitenack
By Gary, Desmond & Parker
Attys.

Oct. 23, 1962 M. E. WHITENACK 3,059,663
RAPID RESPONSE IN-MOTION CONTROL DEVICE
Filed Sept. 21, 1956 4 Sheets-Sheet 3
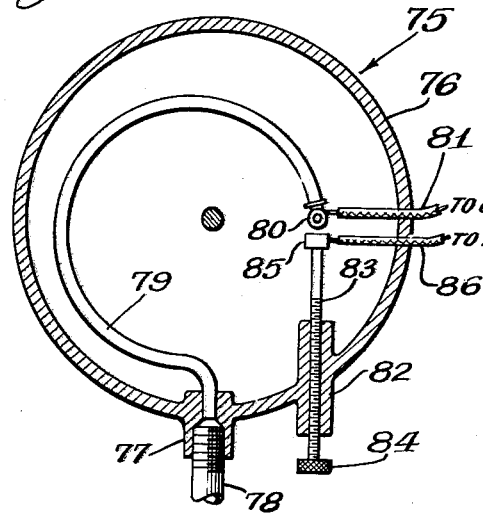
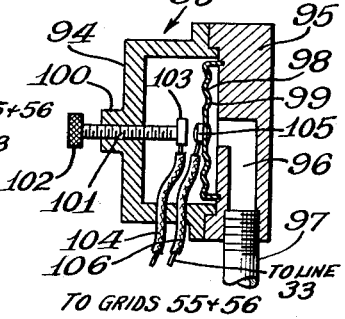
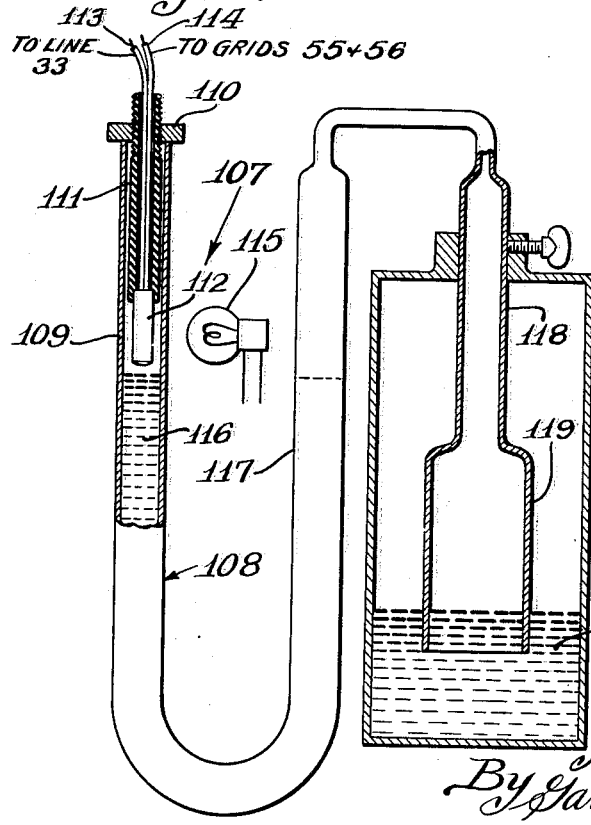
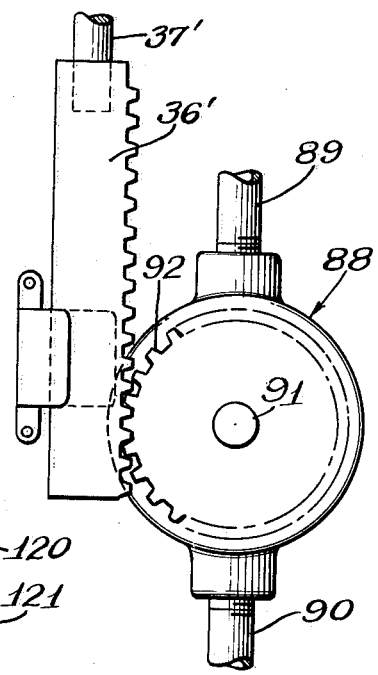
Inventor:
Mirl E. Whitenack
By Gary, Desmond & Parker
Attys.

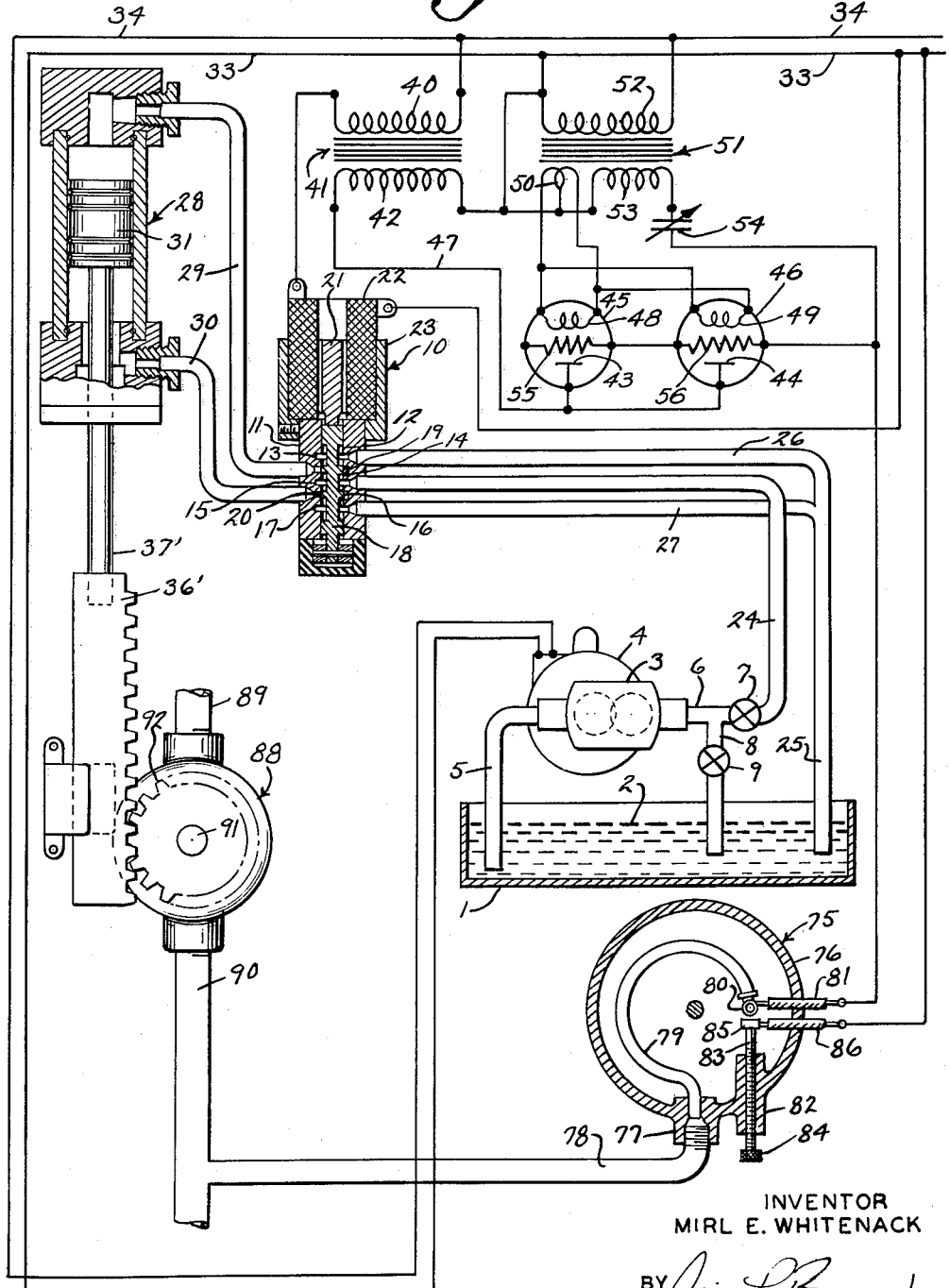

United States Patent Office 3,059,663
Patented Oct. 23, 1962

3,059,663
RAPID RESPONSE IN-MOTION CONTROL DEVICE
Mirl E. Whitenack, Monroe, Wis., assignor to The Swiss Colony Inc., Monroe, Wis., a corporation of Wisconsin
Filed Sept. 21, 1956, Ser. No. 611,283
8 Claims. (Cl. 137—330)

This invention relates to improvements in a control device and refers particularly to an electronic-hydraulic control device for maintaining substantially constant the pressure of a steam or hydraulic power system, the voltage of an electrical power system or the like.

Broadly the invention is directed to the automatic manipulation of a controlling element such as a variable voltage transformer, a rheostat or other electrical control element, or the control valve of a steam, pneumatic or hydraulic system to maintain substantially constant the voltage of the electrical system or the pressure of the steam, pneumatic or hydraulic system, the manipulation of the controlling element responding automatically to the variations in the factor being controlled.

Briefly described the device comprising the present invention comprises, (1) a master which detects or responds to a variation of the factor in the system to be controlled; (2) an electronic amplifier which amplifies the variation detected by the master and furnishes said variations in amplified condition to; (3) a hydraulic selector valve which responds to such variations to pass in a controlled fashion a hydraulic fluid under pressure to; (4) a hydraulic motor which physically manipulates a variable voltage transformer, a rheostat or a valve which controls the factor of the system which produced the variation.

The objects and advantages of the present invention will be more apparent from the accompanying drawings and following detailed description.

FIG. 2 is a diagrammatic view of a master which may be employed with the device shown in FIG. 1.

FIG. 3 is a diagrammatic view of a modified master which may be employed with the device shown in FIG. 1.

FIG. 4 is a diagrammatic view of another type master which may be used in the present invention wherein fluid pressure may be controlled.

FIG. 5 is a diagrammatic view of a different type of master for controlling fluid pressure.

FIG. 6 is a diagrammatic view of a master for controlling liquid level.

FIG. 7 is a fragmentary elevational view of mechanism for controlling the flow or pressure of fluid.

FIG. 8 is a diagrammatic view of a modified control device embodying the features of the present invention and including the master shown in FIG. 4 and the mechanism for controlling the flow or pressure of fluid shown in FIG. 7.

Figure 1:
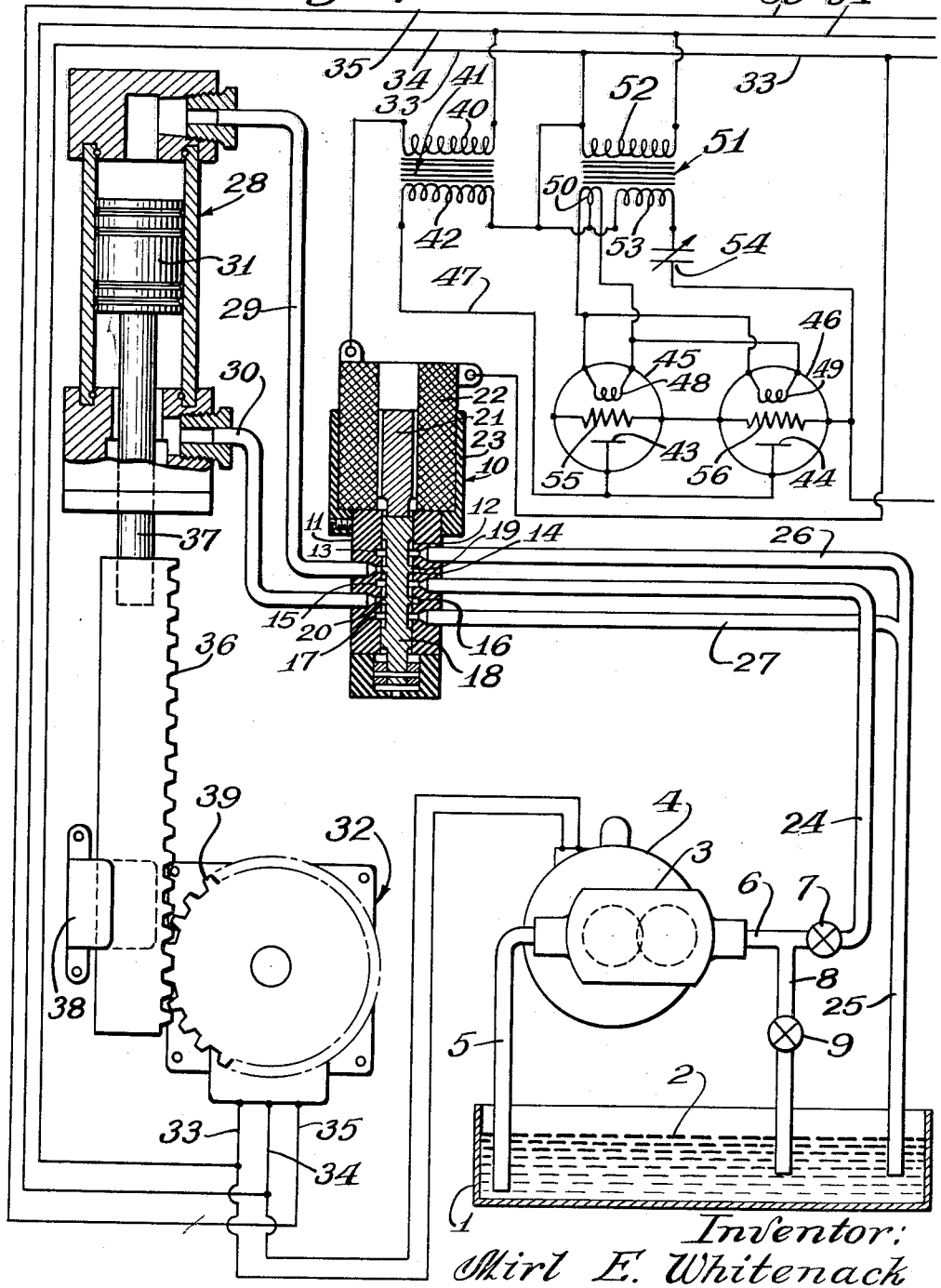
FIG. 1 is a diagrammatic view of the control device embodying the features of the present invention.

In the drawings, and with specific reference to FIG. 1 thereof, 1 indicates a reservoir for holding an available supply of liquid 2. A hydraulic pump 3 driven by motor 4 is positionned adjacent reservoir 1 and intake pipe 5 of the pump dips into the liquid 2 in said reservoir. A discharge pipe 6 connects into the discharge side of pump 3 and a control valve 7 is connected into said discharge pipe. Between the pump 3 and control valve 7, a by-pass pipe 8 connects into the pipe 6, a conventional pressure relief valve 9 being connected into the by-pass pipe 8, the discharge end of the by-pass pipe opening into the reservoir 1.

The valve 7 is adapted to control the volume of the liquid fed to the remaining portion of the system, as will be hereinafter more fully described, and normally when once set need not be controlled thereafter. The pressure relief valve, of course, prevents excess pressure in pipe 6 and the entire hydraulic system.

One of the important features of the present invention resides in the provision of the electro-magnetic selector valve 10. The valve 10 comprises a valve casing 11 preferably constructed of a good grade of bronze or steel. The interior of the casing is provided with a central bore 12 and the interior wall of the bore is provided with five annular recesses 13, 14, 15, 16 and 17. A spool 18 is adapted to reciprocate in bore 12 and said spool intermediate its length carries a pair of annular ribs 19 and 20. The upper end portion of the spool 18 comprises an electro-magnetic plunger which operates within a coil 22, the coil being carried in housing 23 which is mounted upon the valve casing 11.

A pipe 24 connects into the casing 11 and communicates with the annular recess 15. An exhaust pipe 25 discharges at one end into reservoir 1 and at the other end terminates in branch pipes 26 and 27, the branch pipe 26 communicating with annular recess 13 and the branch pipe 27 communicating with the annular recess 17.

A hydraulic cylinder 28 is connected by pipes 29 and 30 to the selector valve 10, pipe 29 at one end connecting into the upper portion of cylinder 28 and pipe 30 at one end connecting into the lower portion of the cylinder. At its other end, pipe 29 connects into the annular recess 14 and pipe 30 at its other end communicates with the annular recess 16.

The arrangement is such that if plunger 21 moves upwardly from the position shown in FIG. 1, pipe 24 is brought into communication with pipe 29 through recesses 15 and 14 and pipe 30 is brought into communication with branch pipe 27 through recesses 16 and 17. Thus, fluid under pressure is delivered from pipe 24 to the upper portion of the cylinder and the lower portion of the cylinder discharges its liquid through pipes 30 and 25. A piston 31 positioned in cylinder 28 is thus moved downwardly. If the plunger 21 moves downwardly, pipe 24 is connected to pipe 30 through recesses 15 and 16 and pipe 29 is connected to pipe 25 through recesses 14 and 13. The piston 31 is then moved upwardly.

In normal position, that is when the factor or condition being controlled is at optimum value, ribs 19 and 20 substantially close communication to pipes 29 and 30 and, hence, piston 31 remains substantially stationary. However, in actual practice piston 21, during said normal position is not absolutely stationary but vibrates through a substantially microscopic amplitude due to minute fluctuations of current in coil 22 correlated to the weight (inertia) of the plunger 21 and spool 18. This is most desirable since it has been found that by maintaining the plunger and spool in a state of vibratory motion, its movement responds more readily and instantaneously to variations in the coil current than would be the case were the plunger and spool maintained absolutely stationary in normal position.

For purposes of exemplifying the use of the present invention, the device is herein described in conjunction with its use in maintaining the voltage of a supply line substantially constant and the actual voltage control element is shown as being a conventional variable voltage transformer 32. The primary of the transformer is connected to an electrical line (not shown) and the secondary thereof is connected to the conductors 33, 34 and 35, conductor 34 being taken from the center tap of the secondary. It is the voltage between conductors 33, 34 and 35 which is controlled by the system illustrated.

A rack 36 is secured at one end to piston rod 37 which carries piston 31. A guide 38 is positioned adjacent the transformer 32 and functions to maintain the rack teeth in mesh with the teeth of gear 39 which is connected to the adjustable element of the transformer, movement of which changes the secondary voltage. Hence, by controlling the current of coil 22 rack 36 may be caused to move in response to variations in said coil current and, hence, the output voltage of the transformer is controlled, that is, maintained substantially constant. Conveniently, the power for pump motor 4 may be taken from the controlled lines 33 and 34.

The coil 22 is connected in series with primary 40 of transformer 41, said coil and primary being connected across lines 33 and 34 from the variable voltage transformer. Hence, variations of current in the coil occur when the current through primary 40 varies. Secondary 42 of transformer 41 is connected at one end to the plates 43 and 44 of electron tubes 45 and 46 by means of conductor 47. Filaments 48 and 49 of the tubes 45 and 46, respectively, are connected to fialment supply secondary 50 of transformer 51, the primary 52 of which is connected across lines 33 and 34. Secondary 53 of transformer 51 is connected in series with secondary 42 of transformer 41 and the opposite end of secondary 53 is connected through variable condenser or capacitor 54 to grids 55 and 56 of tubes 45 and 46, respectively.

Due to the reactive relationship of secondary 42 to primary 40 of transformer 41, the current through coil 22 may be varied by varying the current through secondary 42. Hence, by varying the voltage applied to grids 55 and 56, the plate current, that is the current passing through secondary 42 of transformer 41 may be varied and such variations will be reflected in the current in coil 22.

Referring particularly to FIG. 2, a platform 57 supports a socket 58 which, in turn, carries a carbon filament lamp 59. The platform also supports a photoelectric cell 60 within illumination range of the lamp 59. The lamp 59 may be connected across lines 33 and 34 through variable transformer 61 whereby the illumination of the lamp 59 may be controlled. One side of photoelectric cell 60 is connected to line 33 and the opposite side thereof is connected to grids 55 and 56. The device illustrated in FIG. 2 is the master for sensing the voltage variations across lines 33 and 34.

In the operation of the device thus far described, with predetermined plate current flowing in secondary 42 as determined by the setting of the variable voltage transformer 61, that is, the voltage of grids 55 and 56, a predetermined current flows through coil 22 sufficient to balance spool 18 in its neutral or normal position wherein substantially no fluid flows to or from the hydraulic cylinder 28. The carbon filament lamp 59 is extremely sensitive to voltage variations of lines 33 and 34 and the photocell 60 is likewise extremely sensitive to changes in illumination of lamp 59. Hence, when a change in voltage occurs across lines 33 and 34, the illumination of lamp 59 changes; the current permitted to pass through photocell 60 changes and, hence, the grid voltage changes. The plate current is thereby changed, changing the current in secondary 42 of transformer 41 which reacts upon the current through the primary 40 and, hence, the current through coil 22. Spool 18 is then shifted to move piston 31 upwardly or downwardly, as the case may be and thus the variable transformer 32 functions to change the line voltage of its secondary to its preset substantially constant state. Thus, it will be seen that the current variations produced through the photocell 60 are superimposed in transformer 41 upon the normal current flowing through primary 40 and these superimposed variations function to actuate the spool 18 of selector valve 10.

A typical arrangement which has been found to control the voltage between lines 33 and 34 within less than one-thousandth of a volt variation comprises. transformer 41 having a 117 volt primary and 900 volt secondary. This transformer 41 or reactor was constructed with sufficient iron to be operated from 25 to 150 cycles, giving wide range of "straight-line" control. Transformer 51 had a 117 volt primary; a filament winding 50 of 2½ volts and a phase shift winding 53 of 10 volts. The tubes 45 and 46 were thyraton tubes and in this particular case were exon filled. The condenser 54 was of conventional type with a capacity from 0 to .01 mfd.

Another master which can be employed is illustrated in FIG. 3. In this form of master, a coil 62 carried in casing 63 is mounted upon a suitable support 64. An armature or core 65 carried by a cantilever spring 66 is slidably positioned in the center of the coil, the spring being carried by a suitable support 67. At the end of the spring 66 a contact point 68 is carried which cooperates with a companion fixed contact point 69, the latter being adjustably carried by a suitable support 70. A variable voltage transformer 71, similar to transformer 61 may be connected across lines 33 and 34 and may furnish voltage to the coil 62. The fixed contact point 69 may be connected to grids 55 and 56 by conductor 72 whereas the movable contact point 68 may be grounded to line 33 by conductor 73. Of course, contact point 69 is insulated from support 70.

In this form of master the normal current through coil 62 is adjusted by the variable voltage transformer so that the movable point 68 is closely disposed with respect to the fixed contact point 69, that is, within a distance in which an arc is drawn between said points or at least a degree of ionization occurs between the points. An increase in line voltage will thus decrease the arcing distance and, hence, increase the grid voltage and manipulate the spool of the selector valve to decrease the line voltage by means of variable transformer 32, as hereinbefore described. Conversely, if the line voltage decreases the gap increases and the voltage upon the grids decrease thereby increasing the line voltage.

Another master which may be employed in the present invention is shown diagrammatically in FIG. 4, and is also shown in FIG. 8 in relation with an entire control system for the control of fluid pressure. The master shown in FIG. 4, and designated generally at 75, comprises an adaptation of the usual Bourdon tube for measuring fluid pressures. The master 75 comprises a casing 76 having a threaded apertured boss 77 to which a fluid pressure pipe 78 is connected. Within the casing a conventional Bourdon tube 79 is connected to boss 77, the tube being arcuately bent and being closed at its terminal end. An electrical contact 80 is carried at the closed end of the tube and is connected to a conductor 81 which, in turn, is adapted to be connected to the grids 55 and 56 of tubes 45 and 46, as shown in FIG. 8.

The casing 75 also carries an apertured boss 82 in which an adjustment rod 83 is threadedly positioned. The rod 83, exteriorly of the casing 76, carries a knurled head 84 whereby the rod may be turned and thus moved longitudinally within the boss 82. An electrical contact 85 is carried at the end of rod 83 in juxtaposition with respect to contact 80. A conductor 86 connects with contact 85 and connects said contact to line 33.

Referring particularly to FIGS. 7 and 8, 88 indicates generally a valve which may be connected in a fluid pipe line comprising upstream pipe 89 and downstream pipe 90. Valve stem 91 carries a gear 92 whereby rotation of said gear rotates the valve stem and functions to increase or decrease the flow or increase or decrease the pressure on opposite sides of the valve 88. Rack 36′, similar to rack 36, hereinbefore described, is connected to piston rod 37′ corresponding to piston rod 37, which is adapted to be reciprocated by a piston, similar to piston 31. Thus, as fluid is passed through pipes 29 or 30 to actuate piston 31, valve 88 may be controlled in a manner similar to the control of the variable transformer 32 hereinbefore described.

Fluid pipe 78 may be connected in the pipeline which includes pipes 89 and 90 as shown in FIG. 8 and, hence, variations in pressure in said pipeline function to move the Bourdon tube 79.

As has been hereinbefore described in conjunction with FIG. 3, contact 85 may be adjusted to a fixed normal position with respect to contact 80 in order to preselect an operating pressure at which the system is to be maintained constant. Any variation of the preselected pressure in the downstream pipe 90 changes the current passed between contacts 80 and 85 and also changes the degree of polarity of the grids 55 and 56 with respect to the respective plate 43 and filament 48, and plate 44 and filament 49. Hence, plunger 21 will be moved and piston 31 will function to move rack 36′ to change the position of valve 88. In actual practice an equilibrium position of contact 80 with respect to contact 85 is reached wherein said contacts are substantially infinitesimally spaced from each other. Actually current variations across the contacts 80 and 85 occur through ionization in said varying infinitesimal gap.

Referring particularly to FIG. 5, another form of master is illustrated which may function to establish a constant degree of fluid pressure upon a system. The master shown in FIG. 5 is designated by the reference numeral 93 and comprises a casing 94 having a rear plate 95. A bore 96 is provided in the rear plate 95 into which the threaded end of a fluid pipe 97 is connected. A diaphragm 98 is secured to the rear plate 95 within the casing 94 and the bore 96 connects into zone 99 defined by the diaphragm. A threaded boss 100 is carried by the casing 94 and an adjustment rod 101 is threadedly positioned in the boss. A knurled head 102 is carried upon the rod 101 exteriorly of the casing 94 and may be conveniently used to rotate the rod 101 to move the same longitudinally within the bore 100. An electrical contact 103 is carried upon the inner end of rod 101 and is connected to a conductor 105 which is adapted to be connected to the grids 55 and 56 of the vacuum tubes 45 and 46. A companion contact 105 is carried upon the face of the diaphragm 98, said contact being connected to conductor 106 which may be connected to line 33.

The pipe 97 may be connected to a fluid pressure system which includes valve 88 and by the appropriate adjustment of contact 103 with respect to contact 105 a desired constant fluid pressure may be maintained in the fluid pressure system. As the fluid pressure in the system varies, the diaphragm 98 is flexed and the contacts 103 and 105 change their position relative to each other thus changing the current which passes across said contacts. Variation in current across said contacts changes the degree of polarity of the grids 55 and 56 and hence the current through coil 22 is changed whereby plunger 21 is moved upwardly or downwardly. Movement of plunger 21 passes fluid under pressure through pipes 29 and 30 and hence piston rod 37′ is moved whereby valve 88 is manipulated to alter the pressure within the fluid system. As in the case with the master shown and described in FIG. 4 variations in current across the contacts 103 and 105 occur primarily when a substantially equilibrium position is established, through the ionized atmosphere comprising the infinitesimal space between the contacts 103 and 105.

Referring particularly to FIG. 6, another form of master is shown. The master illustrated in FIG. 6 is designated generally by the reference numeral 107 and comprises essentially a U-shaped manometer tube 108. Leg 109 of the tube 108 carries a cap 110 through which an adjustable photoelectric cell tube 111 is positioned. The tube 111 may be threadedly positioned in the cap 110 whereby the tube may be raised or lowered within the upper portion of the leg 109. A photoelectric cell 112 is carried at the lower end of the tube 111, said cell being connected to conductors 113 and 114 which may be respectively connected to line 33 and to the grids 55 and 56 of the electron tubes 45 and 46.

A light source 115 is positioned adjacent the leg 109 of the manometer tube and is connected to a source of current (not shown). If desired a suitable voltage control may be connected in the light circuit whereby the voltage of said light may be maintained substantially constant so that the intensity of said light remains substantially constant.

The manometer tube may carry a body of liquid 116 which may have an agent incorporated therein which renders the liquid opaque. Accordingly, when the liquid level of the liquid 116 within the leg 109 engulfs or submerges a predetermined portion of the photoelectric cell 112, the quantity of light received by said cell from the light source 115 is varied and hence the current passing through said cell varies. This variation functions to change the degree of polarity of the grids 55 and 56 and hence, in the manner hereinbefore described, the piston rod 37 or 37′ moves in one direction or the other.

In the form of the master illustrated and described in FIG. 6, leg 117 of the manometer tube 108 may be connected at its upper end to a tube 118 which terminates at its lower end in an open bell 119. The tube 118 may be connected in the upper end of a container 120 which may carry a body of liquid 121, the level of which is to be maintained constant. A valve, similar to valve 88, may be connected in a fluid system which feeds liquid to the container 120 and hence by manipulation of the valve 88 the level of the liquid 121 may be raised or lowered.

It can readily be seen that by desirably positioning the photoelectric cell 112 in the leg 109, said cell may function to maintain a constant differential of levels in the legs 109 and 117. For instance, were it desired to maintain a constant level of the liquid 121 above the level illustrated in FIG. 6, the photoelectric cell 112 may be positioned as illustrated in FIG. 6 and while said photoelectric cell is exposed to the light emanating from the light source 115, the rod 37′ may be moved to open the valve 88 whereby the level of liquid 121 will be raised. As the level of liquid in the container 120 is raised, the level of liquid in the leg 117 is depressed and the level of the liquid in the leg 119 is raised until the photoelectric cell is obscured by the opaque liquid 116. At this stage an equilibrium position is reached and any variation in the level of the liquid 121 will cause a variation in the levels of the liquid in the legs 109 and 117 whereby more or less portions of the photoelectric cell 112 will be exposed to illumination. In this fashion an equilibrium is established whereby the liquid level of the liquid 121 may be maintained constant.

In actual practice, movement of the tube 111 upwardly or downwardly may be accompanied by an equal movement of the light source 115 upwardly or downwardly so that the light source will maintain a constant horizontal position with respect to the photoelectric cell. In addition, the container 120 is shown purely in a diagramatic form and might comprise any type of container in which a liquid level is adapted to be constantly established.

Hence, the present invention may be employed with different types of masters which may convert voltage or pressure into a voltage change upon the girds of the tubes 45 and 46 and may also be used with different ultimate control elements such as variable voltage transformer 32 or a valve. Where the invention is employed in controlling line voltage, as has been hereinbefore described, the controlled voltage may be applied to the electrical devices employed, such as, the pump motor 4, and the transformers 41 and 51.

It can be readily appreciated that many modifications which do not depart from the spirit of the invention will suggest themselves to anyone skilled in the art and, hence, it is not intended that the present invention be limited to the precise details shown and described except as necessitated by the appended claims.

I claim as my invention:

1. A control device comprising, a hydraulic motor having a movable element reciprocable in two directions in response to the selective feed thereto of liquid under pressure, a selector valve, two liquid pipe connections between the selector valve and hydraulic motor to feed selectively liquid under pressure to said hydraulic motor to move said element in one direction, a liquid pressure pipe connected to said selector valve, means for passing liquid under pressure to said selector valve through said liquid pressure pipe, a control member freely carried by said selector valve movable therein to feed liquid through a selective pipe to said hydraulic motor in response to predetermined movement of said control member, a coil embracing said control member for moving said control member, means continuously supplying alternating electric current to said coil and vibrating said control member about a predetermined position, a master connected to a power system an energy factor of which is to be controlled, said master comprising means for converting a change in said energy factor of said system to a proportional change of voltage, and means including a vacuum tube inductively connecting said master to said coil current supply and adapted to supply variable pulses to vary said coil current in proportion to the change of voltage of said master, and control means connected to the movable element of said hydraulic motor for controlling the energy factor of said system in response to movement of said hydraulic motor movable element.

2. A control device comprising, a hydraulic motor having a movable element reciprocable in opposite directions in response to the selective feed thereto of liquid under pressure, a selector valve, two liquid pipe connections between the selector valve and hydraulic motor to feed selectively liquid under pressure to said hydraulic motor to move said element in one predetermined direction, a liquid pressure supply pipe connected to said selector valve, means for passing liquid under pressure to said selector valve through said liquid pressure supply pipe, a control member freely carried by said selector valve movable therein to control the feed of liquid through a selective pipe to said hydraulic motor in response to predetermined movement of said control member, electromagnetic means circumscribing said control member and controlling the movement of said control member, means continuously supplying alternating electric current to said electromagnetic means and vibrating said control member about a predetermined position, a master for connection to a power system an energy factor of which is to be controlled, said master comprising means for converting a change in said energy factor of said system to a proportional change of voltage, and means including a vacuum tube inductively connecting said master to said electromagnetic means current supply, said vacuum tube being adapted to pulse modulate said inductive connecting means to vary said electromagnetic means current in proportion to the change of voltage of said master, and control means connected to the movable element of said hydraulic motor for controlling said energy factor of said system in response to movement of said hydraulic motor movable element.

3. A control device comprising, a hydraulic motor having a movable element reciprocable in opposite directions in response to the selective feed thereto of liquid under pressure, a selector valve, two liquid pipe connections between the selector valve and hydraulic motor selectively to feed liquid under pressure and to said hydraulic motor to move said element in one predetermined direction, a liquid pressure supply pipe connected to said selector valve, means for passing liquid under pressure to said selector valve through said supply pipe, a control member freely carried by said selector valve for movement therein to feed liquid through a selective pipe connection to said hydraulic motor in response to predetermined movement of said control member, a coil circumscribing said control member and controlling movement of said control member, means including a transformer continuously supplying alternating electric current to said coil and vibrating said control member about a predetermined position, a master for connection to a power system an energy factor of which is to be controlled, said master comprising means for converting a change in said energy factor of said system to a proportional change of voltage, and means including a vacuum tube inductively connecting said master to said transformer to vary said coil current in proportion to the change of voltage of of said master, the plate circuit of said vacuum tube including a winding of the aforesaid transformer and control means connected to the movable element of said hydraulic motor for controlling said energy factor of said system in response to movement of said hydraulic motor movable element.

4. A control device comprising, a hydraulic motor having a movable element reciprocable in opposite directions in response to the selective feed thereto of liquid under pressure, a selector valve, two liquid pipe connections between the selector valve and hydraulic motor selectively to feed liquid under pressure to said hydraulic motor to move said element in one predetermined direction, a liquid pressure supply pipe connected to said selector valve, means for passing liquid under pressure to said selector valve through said liquid pressure supply pipe, a control member freely carried by said selector valve movable therein to feed liquid through a selective pipe to said hydraulic motor in response to predetermined movement of said control member, a coil embracing said control member and controlling the movement of said control member, means including a transformer continuously supplying alternating electric current to said coil and vibrating said control member about a predetermined position in response to said transformer current, a master for connection to a power system an energy factor of which is to be controlled, said master comprising means for converting a change in said energy factor of said system to a proportional change of voltage, means including a vacuum tube for amplifying said voltage and means for inductively connecting the plate circuit of said vacuum tube to said transformer to vary said coil current in proportion to the change of voltage of said master, and control means connected to the movable element of said hydraulic motor for controlling said energy factor of said system in response to movement of said hydraulic motor movable element.

5. In a control device for maintaining the energy output of a power system substantially constant wherein a movable control member controls by its movement the energy output of the system, and wherein a master converts variations in energy output of the system into proportional changes in voltage, the combination of said control member and master with means for converting changes of voltage of said master to movement of said control member, said means comprising a hydraulic motor having a movable element movable in opposite directions in response to liquid under pressure selectively delivered thereto, means connecting said movable element to said control member to move said control member, a selector valve, pipe means connecting said selector valve to said hydraulic motor, means for supplying liquid under pressure to said selector valve, a movable core freely carried in said selector valve for delivering liquid under pressure selectively to said hydraulic motor upon movement of said core, electromagnetic means circumscribing said core for moving said core, transformer means continuously supplying alternating electric current to said electromagnetic means and vibrating said core about a predetermined position, and means including a vacuum tube connecting said master to said transformer to change the current passed to said electromagnetic means by pulse modulation of said transformer in proportion to the change of voltage of said master.

6. In a control device for maintaining the energy output of a power system substantially constant wherein a movable control member controls by its movement the energy output of the system, and wherein a master converts variations in energy output of the system into proportional changes in voltage, the combination of said control member and master with means for converting changes of voltage of said master to movement of said control member, said means comprising a cylinder and piston reciprocable therein in response to liquid under pressure selectively delivered to said cylinder at opposite sides of said piston, means connecting said piston to said control member to move said control member, a selector valve, means connecting said selector valve to said cylinder, means for supplying liquid under pressure to said selector valve, a movable core freely carried in said selector valve controlling the delivery of liquid under pressure selectively to said cylinder on opposite sides of said piston in response to movement of said core, electromagnetic means embracing said core for moving said core, transformer means continuously supplying alternating electric current to said electromagnetic means and vibrating said core about a predetermined position, and means including a vacuum tube connecting said master to said transformer to change the current passed to said electromagnetic means in proportion to the change of voltage of said master, said vacuum tube having a grid circuit including said master and a plate circuit including a winding on said transformer.

7. In a control device for maintaining the pressure of a fluid pressure system substantially constant wherein a movable control member controls by its movement the pressure of said system, and wherein a master converts variations in pressure of the system into proportional changes in a control actuating voltage, the combination of said control member and master with means for converting changes in control actuating voltage of said master to movement of said control member, said means comprising a hydraulic motor having a movable element movable in opposite directions in response to liquid under pressure selectively delivered thereto, means connecting said movable element to said control member to move said control member, a selector valve, pipe means connecting said selector valve to said hydraulic motor, means for supplying liquid under pressure to said selector valve, a movable core freely carried in said selector valve controlling the delivery of liquid under pressure selectively to said hydraulic motor upon movement of said core, electromagnetic means circumscribing said core for moving said core, transformer means continuously supplying alternating electric current to said electromagnetic means and vibrating said core about a predetermined position, and electronic means including a vacuum tube connecting said master to a winding of said transformer to change the current passed to said electromagnetic means by pulse modulation in proportion to the change of the control actuating voltage of said master.

8. A control device comprising, a hydraulic motor having a movable element reciprocable in two directions in response to the selective feed thereto of fluid under pressure, a selector valve, two pipe connections between the selector valve and hydraulic motor to selectively feed liquid under pressure to said hydraulic motor to move said element in a predetermined direction, a liquid pressure supply pipe connected to said selector valve, means for passing liquid under pressure to said selector valve through said liquid pressure supply pipe, a control member freely carried by said selector valve for movement therein selectively to feed liquid through a selective pipe to said hydraulic motor in response to predetermined movement of said control member, a coil circumscribing said control member to control the movement of said control member, means continuously supplying alternating electric current to said coil and vibrating said control member about a predetermined position including a transformer, a master for connection to a fluid pressure system the pressure of which is to be controlled, said master comprising means for changing pressure of said system to a proportional change of control actuating voltage, and means including a vacuum tube inductively connecting said master to said transformer to vary said continuously supplied coil current in proportion to pulses in the plate circuit of said vacuum tube, said pulses being proportional to the change of control actuating voltage of said master, and control means connected to the movable element of said hydraulic motor for controlling the pressure of said system in response to the movement of said hydraulic motor movable element.

References Cited in the file of this patent

UNITED STATES PATENTS

| | | |
|---|---|---|
| 674,942 | Sprong | May 28, 1901 |
| 1,025,559 | Bliss | May 7, 1912 |
| 2,013,428 | Wright | Sept. 3, 1935 |
| 2,153,378 | Kramer | Apr. 4, 1939 |
| 2,253,129 | Lord | Aug. 19, 1941 |
| 2,325,103 | Bristol | July 27, 1943 |
| 2,423,935 | Hart | July 15, 1947 |
| 2,638,571 | Schulitz | May 12, 1953 |
| 2,655,132 | Scheib | Oct. 13, 1953 |
| 2,662,540 | Rutherford et al. | Dec. 15, 1953 |
| 2,764,178 | Paul et al. | Sept. 25, 1956 |
| 2,767,369 | Schindler | Oct. 16, 1956 |
| 2,782,359 | Koppelmann | Feb. 19, 1957 |
| 2,808,559 | Engle | Oct. 1, 1957 |
| 2,907,885 | Mayer et al. | Oct. 6, 1959 |